March 4, 1969   A. COURIS   3,430,509
DRIVE ASSEMBLY
Filed May 9, 1967
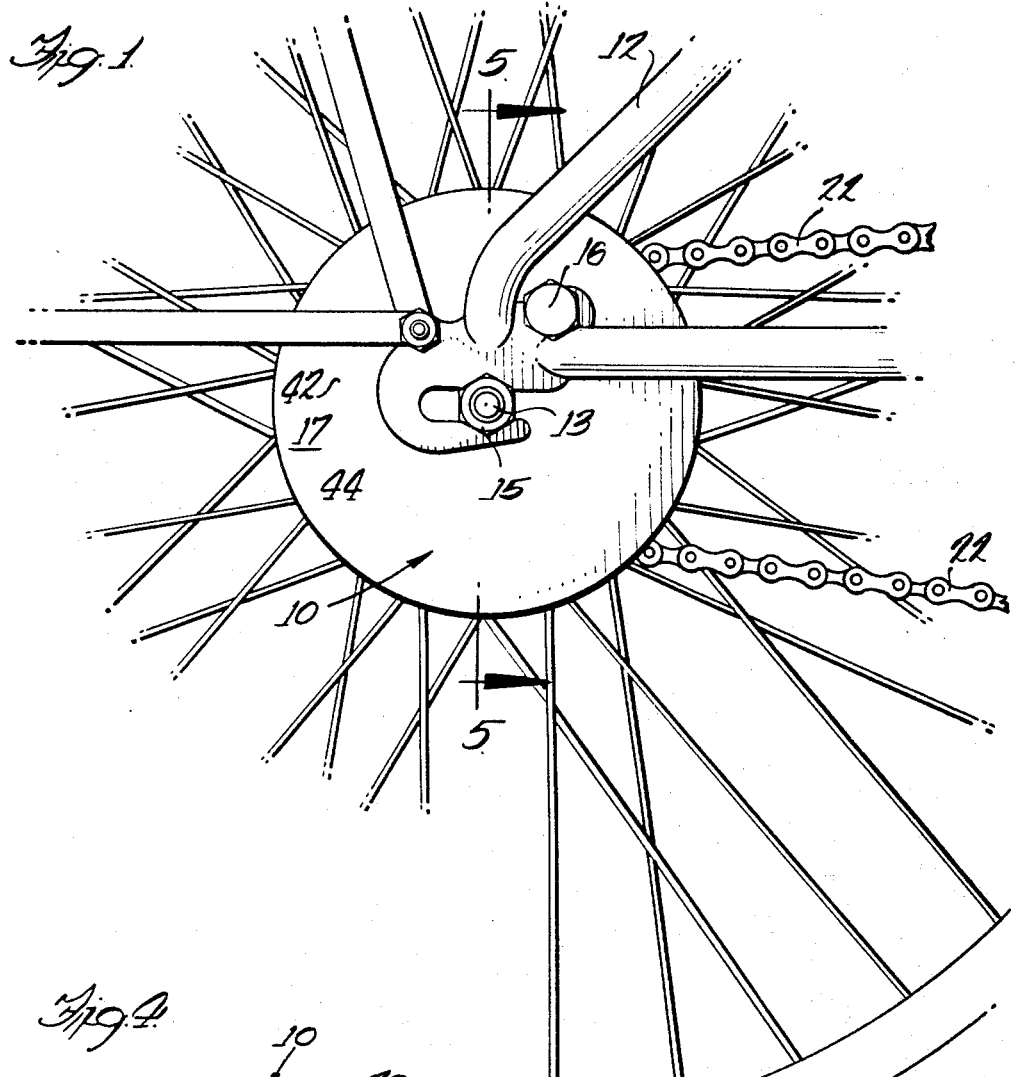
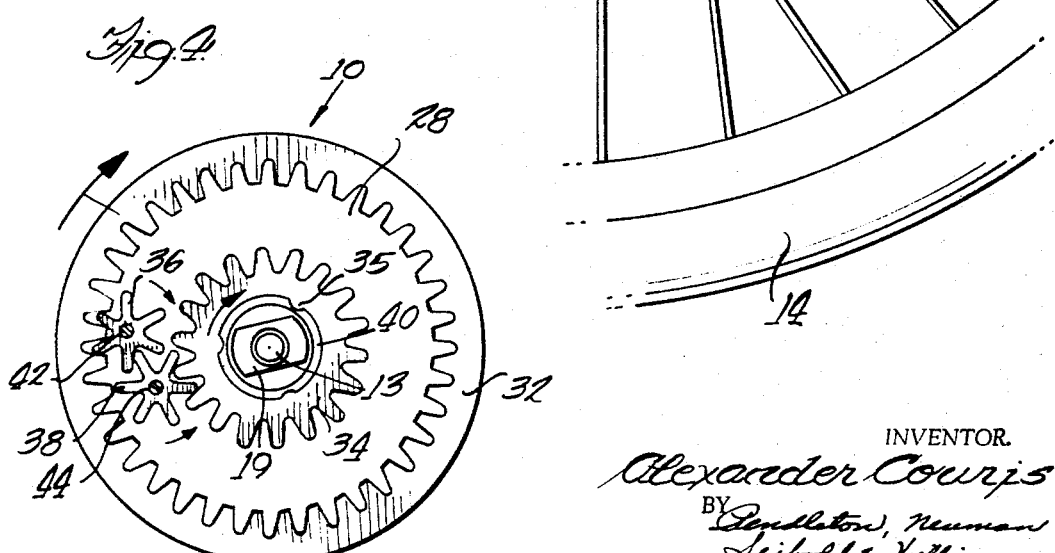
INVENTOR.
Alexander Couris
BY Pendleton, Neuman
Seibold & William
Attys

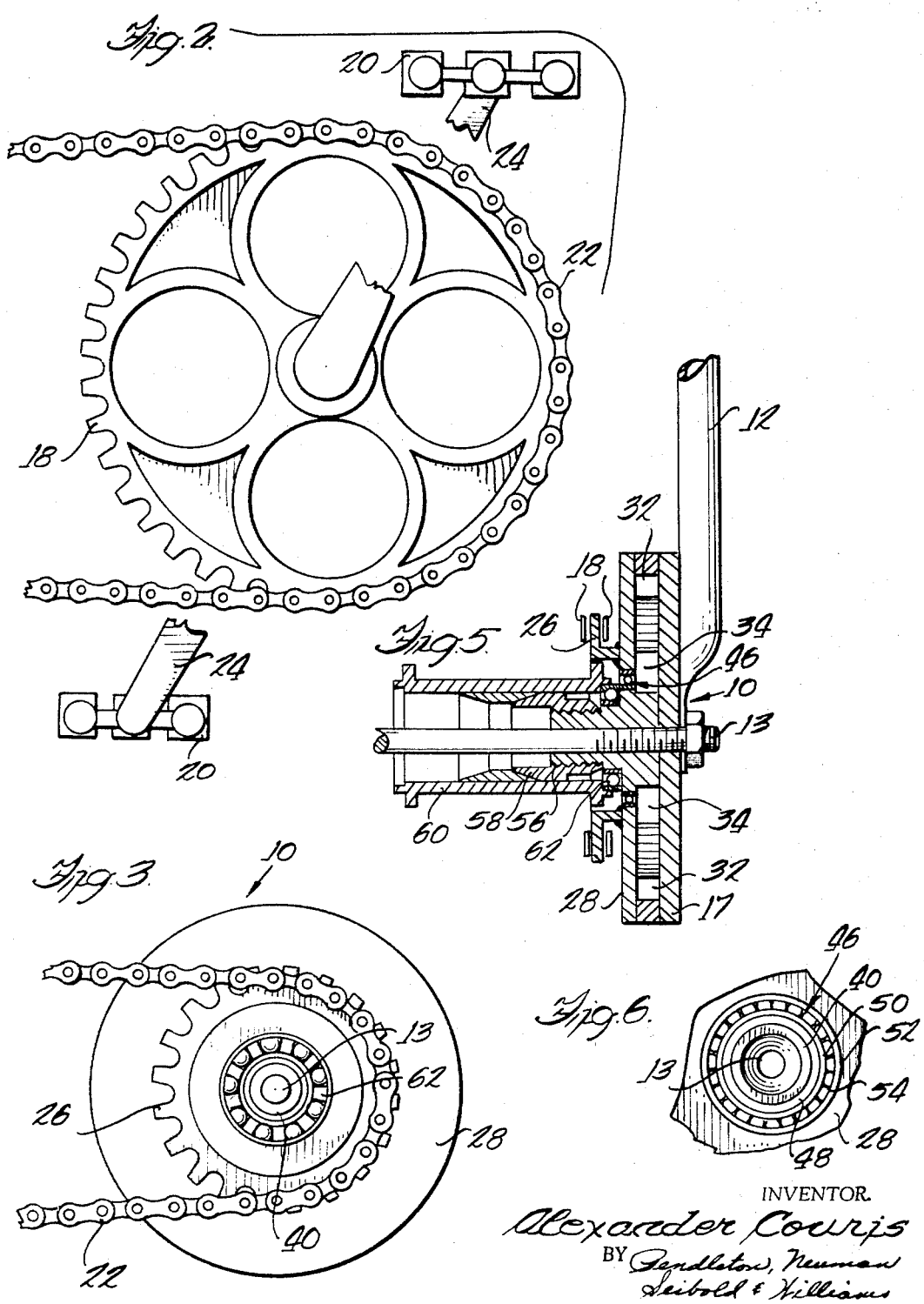

United States Patent Office 3,430,509
Patented Mar. 4, 1969

3,430,509
DRIVE ASSEMBLY
Alexander Couris, 11 S. Milwaukee Ave.,
Wheeling, Ill. 60090
Filed May 9, 1967, Ser. No. 638,193
U.S. Cl. 74—413                    9 Claims
Int. Cl. F16h 1/20

ABSTRACT OF THE DISCLOSURE

A drive assembly for a chain driven cycle having a sprocket which is actuated by the chain and which has an internally toothed gear that drives an external gear through a plurality of idler gears. The external gear is fixed to, and rotates with, a coaster of a conventional coaster brake system that actuates the drive wheel of the cycle.

BACKGROUND OF THE INVENTION

This invention relates to a drive assembly intended for use on cycles, such as bicycles. It consists of a series of gears which step up the speed transferred to the drive wheel. The field of art pertinent to this invention therefore includes land vehicles and drive assemblies and gearing used in such vehicles.

Various drive assemblies have been heretofore used on cycles, and these assemblies often included various types of gearing. However, these assemblies were generally not adaptable to chain drive cycles. In those cases in which the assembly was so adapted, constant changing of the drive sprockets was necessary in order to obtain different or desirable gear ratios. Furthermore, these assemblies were intended to be constructed as part of the cycle, rather than as an attachment that could be used with conventional coaster brake systems of cycles.

SUMMARY OF THE INVENTION

The drive assembly of this invention will step up the speed applied to the drive wheel of a chain driven cycle without any appreciable increase of power applied by the person or instrument operating the cycle. An advantage of the invention is its adaptability to cycles, particularly bicycles, by merely attaching it to the coaster brake of the cycle. The assembly includes a sprocket which is attached to, and rotates with, an internally toothed gear. This gear drives an external or drive gear, communicating therewith through a plurality of idler gears. The sprocket rotates with respect to the hub of the drive wheel of the cycle, and the external gear is fixed with respect to the hub and adapted to rotate therewith. The ratio between the internal gear and the external gear is such that one revolution of the internal gear will cause more than one revolution of the external gear. Thus, the hub rotates at a greater speed than the drive sprocket so that the cycle may be driven at higher speeds with essentially the same application of power to the drive sprocket.

BRIEF DESCRIPTION OF THE DRAWING

FIG. 1 is a front view of one embodiment of the invention showing the embodiment attached to the support for the drive wheel and axle and to the chain of a bicycle. FIG. 2 is a side view of a pedal driven sprocket, showing the part of the chain shown in FIG. 1 which is attached to this sprocket. FIG. 3 is a rear view of the embodiment shown in FIG. 1. FIG. 4 is a front cross sectional view of the embodiment of FIG. 1 in which the front plate has been removed and the interrelationship of the gears is shown. FIG. 5 is a cross sectional view taken along line 5—5 of FIG. 1, showing in addition thereto the axle, hub, and brake of the cycle. FIG. 6 is a rear partial view of the embodiment of FIG. 1 in which the external gear has been removed and the bearing means between the coaster and the sprocket support are shown.

DESCRIPTION OF THE PREFERRED EMBODIMENT

The drawings show the invention as applied to a bicycle. Referring to FIG. 1, it will be seen that the drive assembly 10 is attached to the support 12 for the axle 13 and drive wheel 14 of the cycle by means of bolt 16. The bolt 16 is secured to a circular plate 17 which comprises the front of the embodiment 10. The embodiment 10 and the support 12 are held in place with respect to the axle 13 by a conventional nut 15. FIG. 2 shows the pedal driven sprocket 18 of the cycle, the pedals 20, and the chain 22 attached to this sprocket. The members 24 connecting the pedals to the sprocket 18 are shown in broken lines. FIG. 3 shows the chain 22 attached to the sprocket 26 of the embodiment 10.

As shown in FIG. 5, the sprocket 26 is fixedly mounted on a circular plate 28 by welding or other suitable means. Besides supporting the sprocket 26, the plate 28 also supports the internal gear 32, as will be seen in FIGS. 4 and 5. The plate 28 and the gear 32 are fused so that the sprocket 26 and the internal gear 32 rotate together.

Referring to FIG. 4, it will be seen that the internal gear 32 drives an external gear 34 and communicates with the latter through idler gears 36 and 38. Gear 36 meshes with gears 32 and 38, and gear 38 meshes with gear 34. All of the gears lie in the same plane. The direction of rotation of each gear is shown by the arrows in FIG. 4. In the disclosed embodiment, the ratio between the internal gear 32 and the external or drive gear 34 is 2-to-1. Other gear ratios may be employed where desired. The gears 32 and 34 are held in place with respect to the axle 13 by a conventional nut 19.

The external gear 34 is integral with the coaster 40 and the two parts rotate together. Protuberances 35 fit into corresponding notches in the coaster and enhance the snug fit between these parts.

Bearing means 46 are slipped around the coaster 40, adjacent gear 34, and the bearing means rotate with the coaster. This is shown in FIGS. 5 and 6. The bearing means include a bearing plate 48 which fits tightly on the coaster to prevent slippage and wobbling of embodiment 10, and inside and outside races 50 and 52, respectively, containing ball bearings 54 therebetween. The inside race 50 is pressed against the bearing plate and the two parts rotate together. The inside and outside races of the bearing means rotate with respect to each other.

The coaster 40 contains a threaded portion 56 which is adapted to screw into a conventional brake 58 which is mounted inside the hub 60 of the wheel. The hub 60 fits over the coaster 40 riding on a bearing 62 and another similar bearing, not shown (see FIGS. 3 and 5 for location of bearing 62). Any conventional coaster may be adapted to accommodate the disclosed embodiment 10, or the coaster may be built into the embodiment 10 and be designed to be substituted for the coasters presently used in conventional bicycle brake systems.

The idler gears 36 and 38 are mounted on the plate 17 by means of retainers 42 and 44, shown in cross section on FIG. 4. These gears are spaced from plate 17 and lie in the same plane as gears 32 and 34. Two idler gears have been employed so that the drive gear 34 and the internal gear 32 will rotate in the same direction. Bearings may be used between the retainers 42 and 44 and the gears 36 and 38 mounted thereon to reduce the friction between these parts and allow easier rotation of the gears.

Plate 17 is in face-to-face relationship with internal gear 32 which rotates with respect thereto. This plate and the gear 32 should be spaced from each other or, if they contact each other, a suitable lubricant should be used between them to reduce the friction therebetween.

All or part of the embodiment 10 may be constructed of metal, such as steel or aluminum, or it may be made in part or entirely of plastic.

While a specific embodiment of this invention has been described above, it should be understood that the invention is not limited thereto since many modifications may be made; and it is contemplated, therefore, to cover by the following claims any such modifications as fall within the true spirit and scope of this invention.

What is claimed is:

1. A drive assembly for a cycle in which the drive wheel is adapted to be actuated by a chain drive and is attached to a conventional coaster brake system, said assembly comprising: a sprocket adapted to be rotated by said chain; an internally toothed gear mounted on a plate and fixed with respect to said sprocket; said sprocket and said gear being rotatable with respect to said coaster; an external gear rotatable with said coaster; a bearing means disposed between said plate and said coaster to reduce friction, said bearing means including a bearing plate fixed with respect to said coaster, an inner bearing race fixed wtih respect to said bearing plate, an outer bearing race fixed with respect to said plate, and bearing members disposed intermediate the inner and outer bearing races so that said plate may rotate with respect to said coaster; a plurality of idler gears which cooperate with each other and mesh with the internal gear and the external gear, thereby transferring power from the internal gear to the drive gear, the gear ratio between said internal gear and said external gear being such that one revolution of said internal gear will cause more than one revolution of said external gear.

2. The device of claim 1 in which the internal gear, the external gear, and the idler gears all lie in the same plane.

3. The device of claim 1, wherein the idler gears are mounted on a plate which is fixed to a support for the drive wheel, said gears being spaced from and rotatable with respect to said plate.

4. The device of claim 3, wherein there are two idler gears.

5. The device of claim 3 wherein the internal gear is in face-to-face relationship with the plate on which the idler gears are mounted and rotates with respect to said plate.

6. The device of claim 5 wherein the plate on which the internal gear is mounted is substantially the same shape as the plate on which the idler gears are mounted, and all of the gears are enclosed between these two plates.

7. The device of claim 1, in which the ratio between said internal gear and said external gear is two to one.

8. The device of claim 1 wherein said external gear is attached to threaded means which are adapted to be connected to the brake means of a conventional coaster brake system.

9. The device of claim 1 wherein the bearing members are ball bearings.

References Cited

UNITED STATES PATENTS

| | | | |
|---|---|---|---|
| 625,906 | 5/1899 | Stafford | 74—413 |
| 2,825,246 | 3/1958 | Richards. | |
| 2,871,988 | 2/1959 | Wilkerson | 192—6 X |
| 2,899,030 | 8/1959 | Douglas et al. | 192—6 |

FOREIGN PATENTS

| | | |
|---|---|---|
| 18,355 | 9/1894 | Great Britain. |

DONLEY J. STOCKING, *Primary Examiner.*

LEONARD H. GERIN, *Assistant Examiner.*

U.S. Cl. X.R.

74—432; 192—6